Figure 1:

Sept. 20, 1960  J. S. BRYNER ET AL  2,953,508
PREPARATION OF THORIUM BISMUTHIDE DISPERSIONS
Filed Feb. 10, 1958

INVENTOR.
JOSEPH S. BRYNER
BY    FRANK WILLS 2,953,508

PREPARATION OF THORIUM BISMUTHIDE DISPERSIONS

Joseph S. Bryner, Eastport, and Frank Wills, New York, N.Y., assignors, by direct and mesne assignments, to the United States of America as represented by the United States Atomic Energy Commission Filed Feb. 10, 1958, Ser. No. 714,450

3 Claims. (Cl. 204—154.2)

This invention relates to the preparation of fluid intermetallic dispersions. More particularly, it relates to the preparation of flowable liquid metal compositions containing intermetallic compounds dispersed in a liquid metal.

In order to produce useful power from fissionable or fertile metals such as uranium, thorium and plutonium, it is necessary to transfer heat produced from the fission of nuclear fuels in an apparatus such as a nuclear reactor to a region where the heat may be converted into other forms of useful energy. To facilitate rapid removal of heat as it is produced, provision of a good heat transfer medium in thermal contact with the nuclear fuel is generally desirable. Because of their high heat transfer properties, liquid metals such as bismuth and lead have been proposed for this purpose. A fertile metal such as thorium may be converted to a nuclear fuel by exposing the isotope thorium-232 to a thermal neutron source. By a series of nuclear transformations, the thorium is converted to a fissionable isotope, uranium-233.

It has been proposed to employ compositions such as a mixture of a fissionable or a fertile metal with a liquid metal for use in connection with a nuclear reactor. In such a composition, the liquid metal serves a dual function. It serves as a heat transfer medium and as a carrier for the fissionable or fertile material. A nuclear reactor in which such compositions may be used is disclosed in the co-pending application of R. J. Teitel, S.N. 511,809, filed May 27, 1955, now Patent No. 2,910,-417, issued October 27, 1959.

The solubility of uranium and thorium in liquid bismuth is limited to no more than a fraction of a percent at temperature in the range 270° C. to 550° C. In order to incorporate useful quantities of uranium and thorium in liquid bismuth and solutions of lead and bismuth, it has been found possible to form intermetallic bismuthide compounds dispersed in the aforementioned liquid media. Thus, when concentrations of uranium or thorium are added to liquid bismuth in excess of their solubility in bismuth, the intermetallic uranium and thorium bismuthides are formed and exist in equilibrium with the liquids in which they are dispersed. These compositions, containing the dispersed solids may, but only under certain circumstances, be flowed as liquids through narrow flow passages such as heat exchanger tubes. It is, accordingly, one of the principal objects of the present invention to provide a method for producing fluid compositions of a fissionable or fertile material dispersed in a liquid metal medium, said compositions being suitable for use in connection with nuclear reactors.

The thorium bismuthides are particularly useful as blanket materials; that is, as compositions which will, on exposure to a thermal neutron source, result in transmutation of thorium-232 to uranium-233, a nuclear fuel. Thus, a blanket composition consisting of thorium bismuthides dispersed in liquid bismuth can be used in a nuclear reactor such as the one described in the co-pending application of R. J. Teitel, S.N. 511,809. These compositions, when flowed serially through a reactor and a heat exchanger, will transfer heat from the reactor and simultaneously continuously produce nuclear fuel by nuclear transmutation of the thorium to uranium-233. The compositions of our invention may also be used with an operating reactor such as the Brookhaven research reactor at the Brookhaven National Laboratories to produce uranium-233.

Virtually all of the thorium in compositions of thorium bismuthides dispersed in liquid bismuth is in the solid bismuthide particles. Hence, the bred products, uranium-233 and protactinium-233, are generated, for he most part, in the solid. One method which has been proposed to separate the bred products from the blanket material is to heat these bismuthide compositions to dissolve the bismuthide and bred products and cooling to reform the bismuthide. This treatment increases the ratio of bred products to thorium in the liquid bismuth. The bred products may then be recovered by separating a portion of the liquid bismuth and treating the separated liquid to extract bred products from the bismuth. An additional step of diluting the dispersion with a quantity of bismuth is generally employed. Dilution facilitates separation of the liquid phase, containing the transmutation products of thorium, from the solid dispersed phase. Separation of a quantity of liquid bismuth containing the transmutation products of thorium-232 and/or the products of fission of uranium is then accomplished at a temperature at which thorium is least soluble, about 350° C. A small amount of thorium may be added to replace that transmuted to uranium-233 and that removed in the separated liquid in the manner described in the aforementioned co-pending application of R. J. Teitel. Methods for the removal of certain radiation products from liquid metals are described in the patent of D. W. Bareis, Patent Number 2,758,023, issued August 7, 1956.

The thorium precipitated from solution in accordance with the above procedure is in platelet form. It has been found that the efficiency of separation depends, in large measure, on the size and shape of the bismuthide particles. It has been further found that separation of the liquid phase from a solid phase containing platelets of thorium bismuthide dispersed in thorium may be facilitated by controlling the particle size and shape of the dispered thorium bismuthide. It is accordingly another object of this invention to provide an improved method of treating a composition containing a dispersion of thorium bismuthide in liquid bismuth and including the nuclear transmutation products of thorium-232 and/or the products of fission of uranium in order to separate said products.

On cooling a saturated solution of thorium in bismuth, thorium bismuthide precipitates in platelets, a characteristic, plate-like form, as mentioned before. These platelets may be characterized by their size and shape. The platelets are approximately equiaxial along two dimensions, an averaged measurement taken along these equiaxial dimensions being referred to as the diameter of the platelet. The third, and by far the smallest, dimension of the platelet is referred to as its thickness. For the most part, the platelets have a diameter-to-thickness ratio of substantially over 100. The diameter of the platelets increases with increasing thorium content of the solutions, varying from somewhat less than 100 microns to over 1 centimeter.

Our experiments have shown that in a composition containing 3 to about 10 weight percent thorium, balance bismuth, solids having an average maximum dimension greater than about 100 microns, and having a diameter-to-thickness ratio substantially greater than 10 to 1 render the suspensions in which they are formed inordinately viscous. That is, the viscosity of these dispersions is so high that their utility as fluid media for use as a blanket material in nuclear reactors is virtually destroyed. Moreover, such platelets have a marked tendency to agglomerate to still larger particles. This agglomeration not only hinders but may actually stop fluid flow, particularly through the narrow passages of a heat exchanger. This behavior may also explain somewhat the difficulty in separating the nuclear transmutation products of thorium-232 from a composition containing platelets of the bismuthide having a diameter exceeding about 100 microns dispersed in liquid bismuth. It is, therefore, another object of the present invention to provide a method for preparing a composition containing particles of thorium bismuthide dispersed in liquid bismuth wherein the said particles are of such size and shape as to impart a relatively high fluidity to the dispersions. Other objects will in part be obvious and in part be pointed out hereinafter.

In order to impart a useful measure of fluidity to compositions consisting of the bismuthide dispersed in liquid bismuth, we have found that the size and shape of the bismuthide platelets must be modified to lie within certain close dimensions; that is, the ratio of the maximum diameter of the dispersed particles to their thickness should not exceed a value of about 10 to 1. Platelets having a diameter-to-thickness ratio equal to or less than this value are termed "essentially equiaxial." Platelets having a diameter-to-thickness greater than this value have an increased viscosity and hence a reduced fluidity. The fluidity of the dispersions increases as the diameter-to-thickness ratio decreases.

In accordance with our invention, we have developed a method for preparing thorium bismuthide dispersions in liquid bismuth, wherein the size and shape of the bismuthide platelets may be closely controlled, from solutions containing up to about 10 weight percent thorium in bismuth. In this method a composition of thorium in bismuth is heated to above the liquidus of the composition and rapidly cooled through the temperature range within which most of the thorium bismuthide precipitates. Rapid cooling through this range of temperature at a rate of at least 1000° C. per second insures production of bismuthide platelets, the largest dimension of which is less than 100 microns. Platelets having a diameter substantially greater than 100 microns require excessive treatment times in order to restore fluidity. Particles having a maximum dimension greater than 100 microns, even though they may have a diameter-to-thickness ratio less than 10 to 1 are not suitable since they settle at a relatively rapid rate and therefore tend to impede circulation of the dispersion. Rapid cooling, i.e., cooling at a rate of at least 1000° C. per second from a temperature above the liquidus of the composition by pouring into a container of sufficiently high heat capacity held at a temperature in the range 25° C. to 500° C., and preferably in the range 300° C. to 500° C., insures production of bismuthide platelets, the maximum diameter of which is less than 100 microns. Cooling to a higher temperature produces bismuthide platelets having an appreciably greater maximum dimension than 100 microns.

After rapid cooling, the dispersion of thorium bismuthide platelets of a maximum diameter of less than 100 microns in bismuth is heated isothermally at a temperature in the range 600° C. to 900° C. for a period of time sufficient to form equiaxial platelets having a maximum diameter of less than 100 microns and wherein the ratio of their maximum diameter to thickness is about 10 to 1. A surprising property of the particles formed in this way is the fact that the minimum dimension (i.e., thickness) of the particles increases at a proportionately greater rate than its maximum dimension (diameter), thus approaching an essentially equiaxial shape in three dimensions. Dispersions produced by this method may be used with maximum efficiency as a heat transfer medium.

The accompanying photomicrographs in Figures 1 through 7 illustrate the effect of quenching and reheating of a bismuthide dispersion accordance with our invention.

The following examples demonstrate the method of our invention. These examples are illustrative only and should not be construed as limiting the scope of our invention.

EXAMPLE I

A series of experiments was conducted to determine the degree of equiaxiality necessary for high fluidity in a 10 weight percent thorium dispersion in bismuth and the heat treatment required to produce it. Alloys containing 5 weight percent thorium were heated to 1000° C. to dissolve the thorium and then quenched at a rate of at least 100° C. per second by pouring into graphite crucibles held at 300° C. This treatment produces platelets approximately one micron thick by 60 microns in diameter. Specimens were then reheated at temperatures of 800° C. and 900° C. and held for times ranging from 5 to 30 minutes. During this heat treatment the thickness of the platelets changed at a much greater rate than the diameter as evidenced by their average size given in Table 1. The reheated specimens were then cooled to 300° C. with agitation to keep the solid platelets suspended to serve as nuclei for the precipitation of any dissolved thorium and thus prevent precipitation of new platelets having an undesirable diameter-to-thickness ratio. The specimens were held at 300° C. for one hour without agitation to allow the platelets to settle, and then they were allowed to freeze. Each specimen was sectioned vertically and examined to determine the height of the settled layer. Specimens which had settled sufficiently were then sectioned horizontally to remove enough of the supernatant free bismuth to leave an alloy containing 10 weight percent thorium. Specimens which had settled to less than 10 percent thorium were sectioned just above the settled layer, and the composition calculated by subtracting the weight of the bismuth removed.

Each of the concentrated compositions was tested for fluidity in the temperature range 300° C.–500° C. by observing the time required for a 10-gram sample to flow through a 1/16 inch diameter orifice in a graphite container. A time of two seconds or less was employed as a standard to indicate satisfactory fluidity. Without the reheating step, quenched specimens, as described in the last paragraph, are so viscous at 300° C.–500° C. that they would not pass through the 1/16 inch diameter hole.

The reheated specimens were examined metallographically to determine the particle diameter and thickness of the thorium bismuthide particles. The results are as follows:

*Table 1*

| Reheating Treatment | | Composition, w/o Th. | Flow Time at 300° C.–500° C., sec. | Average Particle Size, microns | |
|---|---|---|---|---|---|
| Temperature, °C. | Time, min. | | | Diameter | Thickness |
| 800 | 5 | 7.65 | 1.4 | 55 | 5 |
| 800 | 15 | 8.93 | 1.4 | 55 | 10 |
| 800 | 20 | 10.00 | 1.4 | 55 | 11 |
| 800 | 30 | 10.00 | 1.5 | 55 | 12 |
| 900 | 5 | 10.00 | 1.5 | 55 | 12 |
| 900 | 30 | 10.00 | 1.7 | 80 | 30 |

These results indicated that a diameter-to-thickness ratio of no greater than 5 to 1 is necessary for fluidity in a 10 weight percent thorium dispersion. This ratio can be achieved by heat treatment of the quenched compositions for a period of five minutes at 900° C. or 20 minutes at 800° C. where quenching was accomplished by the method described above. For a 5 weight percent thorium dispersion which has been rapidly quenched from 1000° C. to 25° C., heat treatment at 700° C. for 5 minutes restores fluidity. This heat treatment reduces the diameter-to-thickness ratio from over 50 to 1 to about 9 to 1.

Figure 2:
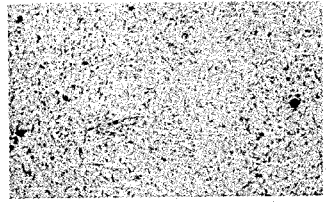

The effect of quenching the solutions is shown in the photomicrographs of Figures 1 and 2 at 150 times magnification. Figure 1 shows a composition containing 10 weight percent thorium in bismuth (soluble at 1060° C.) quenched from 1100° C. and Figure 2 shows a composition containing 5 weight percent thorium in bismuth (soluble at 950° C.) which has been quenched from 1000° C., both having been quenched by pouring into water-cooled graphite crucibles maintained at room temperature.

The layered structure in Figure 1 shows how an individual drop of solution flattened and froze in the fraction of a second before the following drop landed. The layered structure emphasizes the rapidity of the quenching rate necessary to produce the small platelets. Our experiments have shown that the cooling rate must exceed 1000° C. per second to produce platelets less than 100 microns in maximum dimension. The increase in size of the platelets in Figure 1 from the bottom to the top of each layer demonstrates the sensitivity of the dependence of particle size upon cooling rate. The compositions of Figures 1 and 2 did not have the requisite fluidity.

EXAMPLE II

Figure 3:
Figure 4:
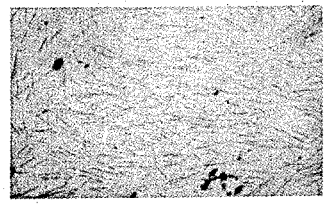

Figures 3 and 4 are photomicrographs (at 150 diameters magnification) of two alloys of 5 percent thorium which were heated to 1000° C. and quenched at a rate of about 1000° C. per second into crucibles maintained at 300° C. and 500° C., respectively, and then slowly cooled to room temperature. The diameter of the platelets is larger than in the alloy poured into water-cooled crucibles (Figures 1 and 2) because of slower rate of cooling through the temperature range in which most of the compound precipitates. The very small platelets which can be seen in Figure 3 indicate that platelets of the desired size may be produced without freezing the bismuth during the quenching. These compositions were not fluid at temperatures in the range 300° C.–500° C.

EXAMPLE III

Figure 5:
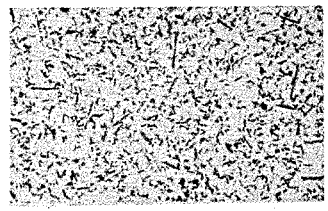
Figure 6:
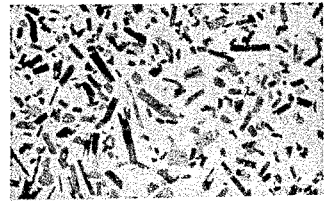
Figure 7:
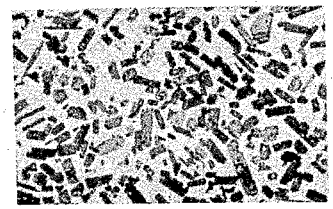

The effect of the time and temperature of reheating the small platelets is shown in Figures 5, 6 and 7 which are photomicrographs at 150 diameters magnification. All three of the dispersions shown were produced by reheating pieces cut from an alloy of 5 percent thorium in bismuth poured at 1000° C. into a water-cooled crucible maintained at room temperature like the dispersion shown in Figure 2.

Figure 5 illustrates the quenched specimen after reheating at 600° C. for 5 minutes. The platelets have thickened without an appreciable increase in length. A few of the particles are elongated. However, the approach to equiaxiality is apparent. Figures 6 and 7 show the same quenched alloy after reheating to 900° C. and held at that temperature for 5 minutes and one hour respectively and indicate that the degree of approach to equiaxiality increases with temperature and with time. All three dispersions had satisfactory fluidity. The approach to equiaxiality of the dispersions of Figures 5, 6 and 7 is shown by comparison with the dispersion of Figure 2. The diameter-to-thickness ratio has evidently decreased greatly from the diameter-to-thickness ratio of the quenched dispersion of Figure 2.

EXAMPLE IV

A mixture of 10 weight percent thorium and the remainder bismuth was heated to a temperature of 1100° C. to form a solution of thorium in liquid bismuth. The solution was rapidly quenched by pouring it into a container holding liquid bismuth maintained at 300° C. The weight of liquid bismuth was sufficient to form a composition consisting of 5 weight percent thorium and liquid bismuth, the thorium being almost entirely present as thorium bismuthide platelets having average maximum diameter of about 20 microns. A 10-gram sample of this composition was heated to 500° C. and then allowed to flow through a 1/16 inch diameter hole in a graphite container. The liquefied sample would not flow through the hole. The remainder of the composition was then heated to 800° C. for one hour, and four 10-gram samples were taken from the reheated sample and allowed to cool with agitation to 500° C. The samples were then allowed to flow through the 1/16 inch hole. The times required for the samples to flow through the hole were 1.7, 1.9, 2.0 and 1.9 seconds respectively.

The method of our invention has produced essentially equiaxial bismuthides from batches of up to 250 grams in accordance with Examples I–IV. However, for forming dispersions of the desired size and shape (i.e., of less than 100 microns in maximum diameter and equiaxial) with considerably larger batches, we may employ a modification of the method of our invention. It should be noted that Examples I–IV illustrate on a laboratory scale the method of our invention. However, these laboratory-scale techniques are usually not amenable for rapidly cooling very large batches of thorium-bismuth solutions to form particles of the desired size and shape.

We have found that we may produce, on a continuous production basis, thorium bismuthide platelets of less than 100 microns in diameter (maximum dimension) by atomizing molten mixtures of thorium and bismuth. By atomization we mean the disintegration of a molten mixture to form solid droplets by a controlled flow of compressed gas.

We have found that by atomization of a solution of thorium and bismuth, solid bismuth droplets of less than about 60 microns in diameter may be produced. These bismuth droplets contain thorium bismuthide platelets of less than about 50 microns, but are not of the required shape. That is to say, the bismuthide platelets have a diameter-to-thickness ratio greater than about 50 to 1. In order to convert these particles to the desired degree of equiaxiality it is necessary to reheat the solid bismuth particles containing thorium bismuthide to a temperature in the range 600° C. to 900° C.

In carrying out the atomization procedure, a mixture of bismuth and the desired amount of thorium is melted at the requisite temperature (above the liquidus) in an induction, bottom-pour furnace provided with an outlet tube or nozzle. The melting is carried out in an inert atmosphere such as helium or argon or under vacuum. The liquefied metal is then passed from the furnace nozzle to a large atomization chamber. A ring nozzle is mounted close to the mouth of the nozzle and has a series of angled apertures uniformly spaced in a circular array. In one design we have used a ring nozzle containing 36 holes on a 3-inch diameter circle, the holes being .040 inch in diameter and directed away from the furnace along the elements of a light-angled cone at 20° from the vertical. An inert gas such as helium or argon is blown through the holes in the ring nozzle at a high pressure to form a converging cone of atomizing gas. The gas jets converge just below the pouring nozzle. A conduit is provided in the chamber for recirculating the atomizing gas.

EXAMPLE V

A series of atomization tests were performed under the following conditions: A metal charge containing 4 percent by weight of thorium in bismuth was heated in the melting furnace to a temperature above the liquidus of the composition. Melting was carried out in a helium atmosphere. On attaining the requisite temperature the liquefied metal was allowed to flow in a steady stream into the atomization chamber. As soon as a steady flow was obtained from the pouring tube or nozzle, compressed helium was applied through the ring nozzle into the atomization chamber at the stream of metal. The molten solution was poured through a 1/8 inch nozzle directly into the converging gas cone in the atomization chamber. The powder product is collected at the bottom of the atomization chamber in mineral oil or in liquid bismuth maintained at about 300° C.

Atomization gas efficiency is an important parameter in this procedure. In processing thorium bismuthide blanket compositions which have already been circulated through an operating nuclear reactor, the atomizing gas will become radioactive through the removal of gaseous fission products. Efficient use of an atomizing gas will reduce the volume of gas required for atomization and keep the required equipment and radiation shielding to a minimum. By atomization gas efficiency we mean the number of grams of less than about 60-micron (less than 250 mesh) bismuth particles produced per cubic foot of gas consumed. Several of the process variables were tested and some results are summarized in Table 2.

Table 2

| Test No. | Gas Pressure, p.s.i.g. | Bismuth and Thorium Bismuthide, percent 62 microns (−250 mesh) | Efficiency (grams of less than 250 mesh bismuth/cu. ft. gas consumed) |
| --- | --- | --- | --- |
| 1 | 80 | 1 34.2 | 5.0 |
| 2 | 100 | 62.1 | 13.4 |
| 3 | 150 | 77.4 | 13.7 |
| 4 | 210 | 93.0 | 10.6 |

1—200 mesh.

In a number of tests, atomization rates were varied from 2.3 pounds to 18 pounds of metal per minute. All tests poured at less than 10 pounds per minute produced poor results.

It will thus be seen that by our method we are able to impart to the thorium bismuthide particles the peculiar property of a differential rate of growth; i.e., a rate of growth in the direction of the minimum dimension greater than in the direction of the maximum dimension. By quenching a solution of thorium and bismuth at a rate of at least 1000° C. per second, the quenched solution forms bismuthide platelets having a maximum dimension of less than 100 microns. More important, however, is the fact that these platelets will, on reheating to a temperature in the range of 600°–900° C., grow at a more rapid rate along its minimum dimension, i.e., thickness, thus assuring the formation of essentially equiaxial particles.

The technique of atomization, as described in Example V, has the added advantage that the liquefied solution of thorium in bismuth forms solid droplets less than about 60 microns. Since these solid droplets contain thorium bismuthide dispersed therein, none of the bismuthide particles can have a maximum diameter greater than 60 microns. While the thorium bismuthide dispersed in the solid bismuth droplets does not have the required diameter-to-thickness ratio, the solidified droplets may then be reheated to a temperature in the range 600°–900° C. to form a fluid composition of essentially equiaxial particles of thorium bismuthide dispersed in liquid bismuth wherein the bismuthide grows preferentially along its minimum dimension.

Since many embodiments might be made in the present invention and since many changes might be made in the embodiment described, it is to be understood that the foregoing description is to be interpreted as illustrative only and not in a limiting sense.

We claim:

1. A method of forming a fluid composition containing thorium bismuthide dispersed therein which comprises heating a mixture containing bismuth and 3–10 weight percent thorium to above the liquidus of said mixture, rapidly cooling the liquefied composition from said liquidus at a rate exceeding 1000° C. per second to a temperature below 500° C. to form thorium bismuthide platelets dispersed in bismuth, said platelets being characterized by having a maximum dimension of up to about 100 microns and a diameter-to-thickness ratio substantially greater than 10 to 1 and thereafter increasing the thickness of said platelets relative to their diameter by maintaining said composition at a temperature in the range 600°–900° C. for approximately 5 to 60 minutes to form thorium bismuthide particles having a diameter-to-thickness ratio not exceeding about 10 to 1.

2. A method of forming a fluid composition containing thorium bismuthide dispersed in liquid bismuth which comprises heating a mixture containing bismuth and 3–10 weight percent thorium to above the liquidus of said composition, cooling the thus formed solution at a rate of at least 1000° C. per second to a temperature below 500° C. by passing said solution of thorium in bismuth through an orifice to form a narrow stream of liquid, passing said stream through the apex of a converging cone of a pressurized inert gas to atomize the stream and form solid bismuth droplets having a diameter not exceeding about 100 microns and containing thorium bismuthide dispersed therein, and thereafter heating said droplets to a temperature in the range 600°–900° C. for approximately 5 to 60 minutes to form a fluid dispersion of thorium bismuthide in liquid bismuth.

3. The method according to claim 2 in which said stream is atomized at a rate of 10–18 pounds of said composition per minute.

References Cited in the file of this patent

TID–7526 (Pt. 1), pages 103–114, February 1957, published by AEC.